(12) United States Patent
Lee et al.

(10) Patent No.: US 8,577,418 B2
(45) Date of Patent: Nov. 5, 2013

(54) SYSTEMS AND METHODS FOR PRESENTING CONFERENCE CALL PARTICIPANT INDENTIFIER IMAGES ON A DISPLAY OF A MOBILE DEVICE

(75) Inventors: John Jong-Suk Lee, Waterloo (CA); Leon Vymenets, Mississauga (CA)

(73) Assignee: BlackBerry Limited, Waterloo, Ontario (CA)

( * ) Notice: Subject to any disclaimer, the term of this patent is extended or adjusted under 35 U.S.C. 154(b) by 971 days.

(21) Appl. No.: 12/257,509

(22) Filed: Oct. 24, 2008

(65) Prior Publication Data
US 2010/0105437 A1     Apr. 29, 2010

(51) Int. Cl.
*H04B 1/38* (2006.01)

(52) U.S. Cl.
USPC ...... 455/566; 455/416; 379/202.01; 370/259; 370/271

(58) Field of Classification Search
USPC ............... 455/416, 415, 417, 403, 414.1; 370/259–271; 379/201, 157–158; 348/14.01–14.16; 345/156, 629, 173, 345/1.1
See application file for complete search history.

(56) References Cited

U.S. PATENT DOCUMENTS

| | | | |
|---|---|---|---|
| 6,515,656 B1 * | 2/2003 | Wittenburg et al. | 345/418 |
| 2004/0162144 A1 | 8/2004 | Loose et al. | |
| 2005/0275636 A1 * | 12/2005 | Dehlin et al. | 345/173 |
| 2006/0121927 A1 | 6/2006 | Joung | |
| 2006/0126047 A1 | 6/2006 | Bijvoet | |
| 2006/0271867 A1 * | 11/2006 | Wang et al. | 715/764 |
| 2006/0281541 A1 | 12/2006 | Nguyen et al. | |
| 2008/0051195 A1 | 2/2008 | Hedrick et al. | |
| 2008/0091778 A1 * | 4/2008 | Ivashin et al. | 709/204 |
| 2010/0040217 A1 * | 2/2010 | Aberg et al. | 379/202.01 |

FOREIGN PATENT DOCUMENTS

| | | |
|---|---|---|
| EP | 1954014 A | 8/2008 |
| WO | 2006/126047 A | 11/2006 |

OTHER PUBLICATIONS

Little Springs Design.com, "Carousel—From MobileDesign" Available: http://patterns.littlespringsdesign.com/index.php/Carousel. Retrieved: Aug. 18, 2008.
Ajaxian.com, "Y! UI Carousel Component", Jul. 14, 2006, Available: http://ajaxian.com/archives/y-ui-carousel-component. Retrieved: Aug. 18, 2008.
European Examination Report (Application No. 08167500.1) dated Nov. 12, 2009.

(Continued)

*Primary Examiner* — Chuong A Ngo
(74) *Attorney, Agent, or Firm* — Bereskin & Parr LLP/S.E.N.C.R.L., s.r.l.

(57) ABSTRACT

The described embodiments relate generally to methods and systems for displaying on a handheld electronic device a plurality of participant images corresponding to a plurality of conference call participants. The device includes a display, a communications module configured for sending and receiving communication signals; and a display interface operatively coupled to the display and to the communications module, wherein the display interface is configured to respond to user input. The method comprises: establishing a conference call having a plurality of participants; displaying a participant screen on the display; for each participant, determining a participant identifier image; and displaying on the participant screen a dynamic carousel comprising a plurality of participant identifier images. The mobile device may include an image database comprising at least one stored image, and wherein at least one participant identifier image is selected from the at least one stored image.

21 Claims, 10 Drawing Sheets

(56) References Cited

OTHER PUBLICATIONS

European Communication: "Summons to Attend oral proceedings pursuant to Rule 115(1) EPC" (Application No. 08167500.1) dated Feb. 17, 2011.
European Search and Examination Report (Application No. 08167500.1),dated Feb. 25, 2009.
Provision of the minutes in accordance with Rule 124(4) EPC, issued on European Patent Application No. 08167500.1, dated Jun. 10, 2011.
Decision to Refuse a European Patent application, issued on European Patent Application No. 08167500.1, dated Jun. 10, 2011.
"Summons to attend oral proceedings pursuant to RUle 115(1) EPC", issued on European Patent Application No. 08167500.1, dated Sep. 21, 2012.
Office Action issued on Canadian Application No. 2,683,196, dated Jul. 4, 2012.
Written Submission as filed on European Patent Application No. 08167500.1, dated Dec. 10, 2012.
Document relating to European Application No. 08167500.1, dated Apr. 30, 2013 (Decision to Refuse).

* cited by examiner

SYSTEMS AND METHODS FOR PRESENTING CONFERENCE CALL PARTICIPANT INDENTIFIER IMAGES ON A DISPLAY OF A MOBILE DEVICE

TECHNICAL FIELD

Embodiments described herein relate generally to mobile device applications, and more specifically to phone-equipped mobile devices equipped to participate in conference calls having multiple conference call participants.

BACKGROUND

Mobile devices often provide multimedia functionality. In addition to providing various communication functionality, mobile devices are also typically equipped to display images or other multimedia information to a user. Phone-equipped mobile devices may be adapted to participate in conference calls having multiple participants.

It is desired to address or ameliorate one or more shortcomings or disadvantages associated with existing ways of displaying and/or managing conference call participant identifier information on a mobile device, or to at least provide a useful alternative to such ways.

BRIEF DESCRIPTION OF THE DRAWINGS

For a better understanding of the described example embodiments and to show more clearly how they may be carried into effect, reference will now be made, by way of example, to the accompanying drawings in which.

DETAILED DESCRIPTION

Figure 1:
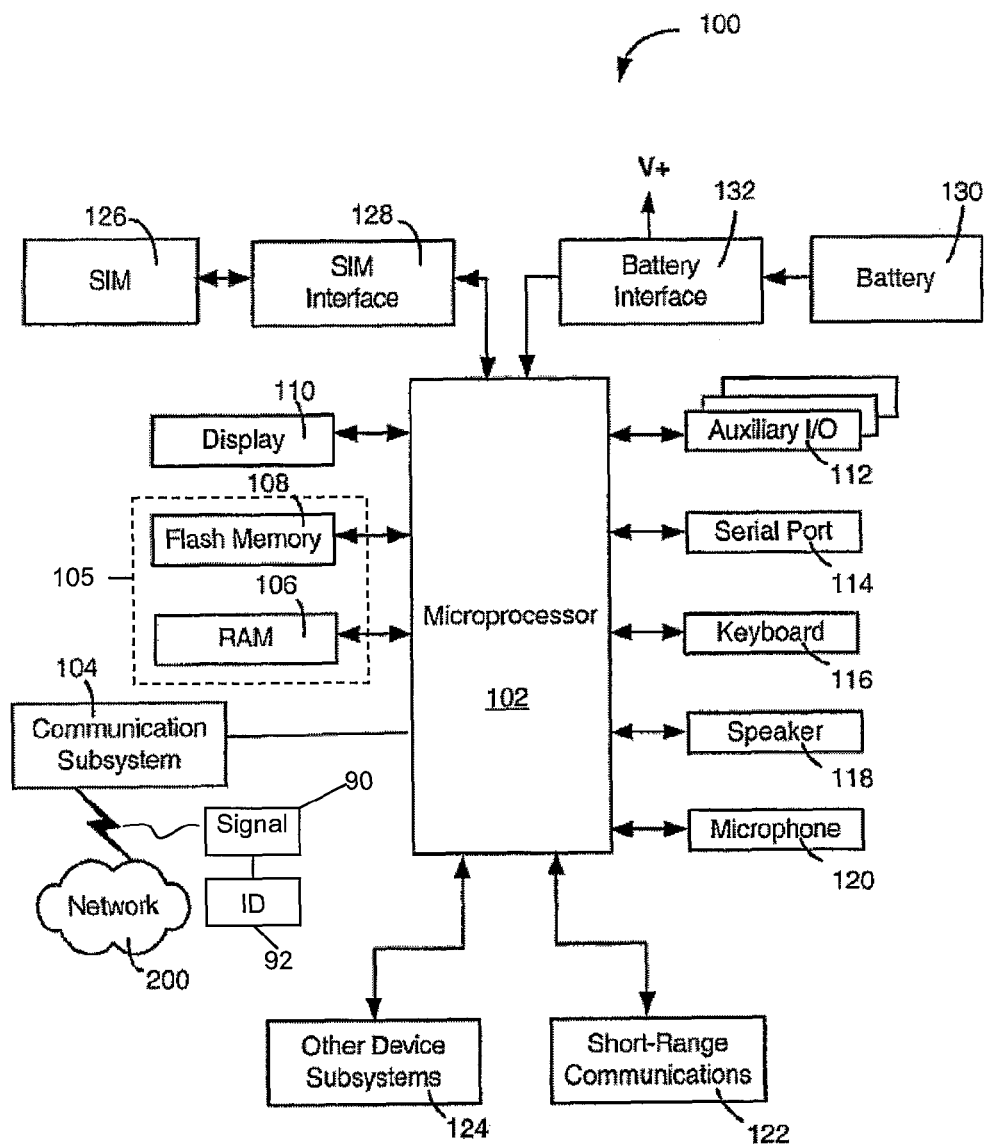
FIG. 1 is a block diagram of a mobile device in one example implementation.

Embodiments described herein are generally directed to systems and methods for providing conference call participant identifier information to a mobile device user.

In a broad aspect, there is provided a method for displaying on a handheld electronic device a plurality of participant images corresponding to a plurality of conference call participants, the device having a display, a communications module configured for sending and receiving communication signals; and a display interface operatively coupled to the display and to the communications module, wherein the display interface is configured to respond to user input. The method comprises: establishing a conference call having a plurality of participants; displaying a participant screen on the display; for each participant, determining a participant identifier image; and displaying on the participant screen a dynamic carousel comprising a plurality of participant identifier images. The mobile device may include an image database comprising at least one stored image, and wherein at least one participant identifier image is selected from the at least one stored image. Further, the display interface may include a user input component having at least one selected from the group consisting of: a keyboard, a thumbwheel, a trackball, a directional pad, a joystick and a touch screen.

An alternate aspect is directed towards a method of providing on a mobile device a user interface for identifying a plurality of participants on a conference call, the method comprising:
 (a) displaying a participant screen on a display of the mobile device;
 (b) for each participant, determining a participant identifier image; and
 (c) displaying on the participant screen a dynamic carousel comprising a plurality of participant identifier images.

The mobile device may include an image database comprising a plurality of stored images, and wherein at least one participant identifier image is selected from the stored images. As well, the mobile device may include a display interface operatively coupled to the display. The display interface may be configured to respond to user input and selectively modify the carousel of participant identifier images on the participant screen.

In some implementations, the mobile device also includes a communications module configured for sending and receiving communication signals. Such communications module may be configured to engage a plurality of communication modes.

The display interface may be configured to select a designated participant identifier image corresponding to a designated participant. In some such implementations, the display interface is configured to engage at least one communication mode corresponding to the designated participant.

The communication modes may include, for example, sending and receiving: a voice signal; a multimedia signal; an instant message; and an email message.

The display interface may include a user input component, and the user input component may include at least one selected from the group consisting of: a keyboard, a thumbwheel, a trackball, a directional pad, a joystick and a touch screen.

A computer-readable medium may also be provided comprising instructions executable on a processor of the mobile device for implementing the method(s).

Another broad aspect is directed to a mobile device comprising a processor, a display, and a communications module, wherein the processor is configured to execute an application programmed to perform the steps of:
 (d) displaying a participant screen on the display;
 (e) for each participant of a conference call, determining a participant identifier image; and
 (f) displaying on the participant screen a dynamic carousel comprising a plurality of participant identifier images.

In some embodiments, the mobile device includes an image database having a plurality of stored images, and at least one participant identifier image is selected from the stored images. The mobile device may also include a display interface operatively coupled to the display; the display interface is configured to respond to user input and selectively modify the carousel of participant identifier images on the participant screen. The communications module may be configured to engage a plurality of communication modes, which may include, for example, sending and receiving: a voice signal; a multimedia signal; an instant message; and/or an email message.

In certain variations, the display interface is configured to select a designated participant identifier image corresponding to a designated participant. In addition, the display interface may be configured to modify at least one communication mode corresponding to the designated participant. The display interface may also have a user input component, which may include, for example, at least one selected from the group consisting of: a keyboard, a thumbwheel, a trackball, a directional pad, a joystick and a touch screen.

These and other aspects and features of various embodiments will be described in greater detail below.

Some embodiments described herein make use of a mobile station. A mobile station is a two-way communication device with advanced data communication capabilities having the capability to communicate with other computer systems, and is also referred to herein generally as a mobile device. A mobile device may also include the capability for voice communications. Depending on the functionality provided by a mobile device, it may be referred to as a data messaging device, a two-way pager, a cellular telephone with data messaging capabilities, a wireless Internet appliance, or a data communication device (with or without telephony capabilities). A mobile device communicates with other devices through a network of transceiver stations.

Figure 2:
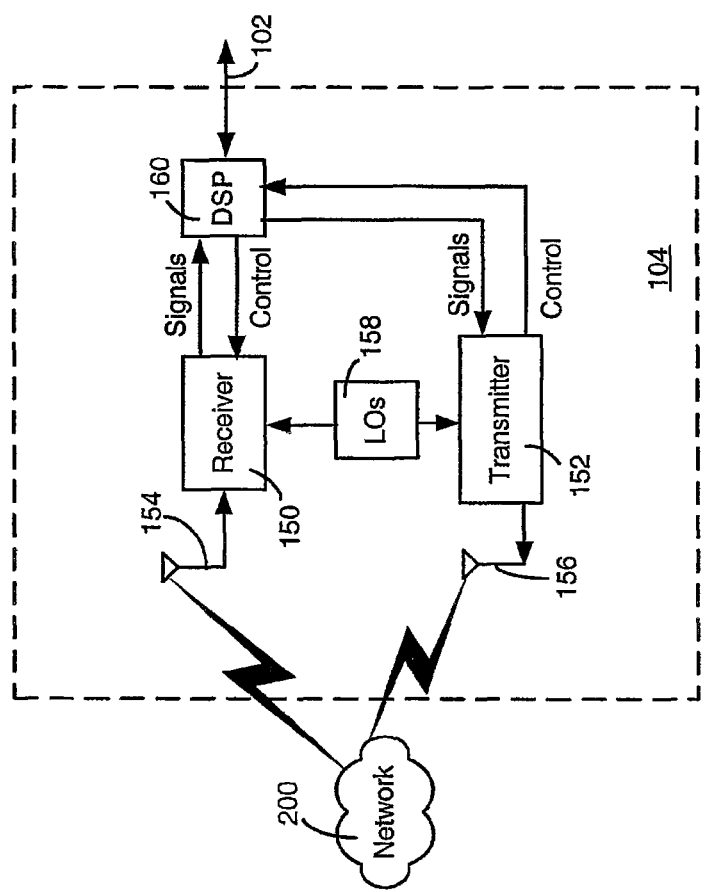
FIG. 2 is a block diagram of a communication sub-system component of the mobile device of FIG. 1.
Figure 3:
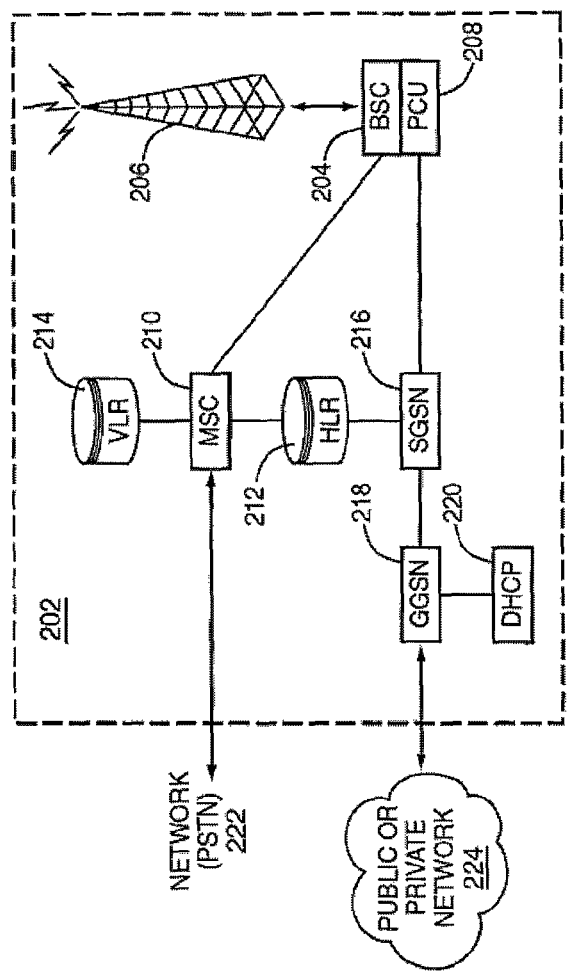
FIG. 3 is a block diagram of a node of a wireless network.

To aid the reader in understanding the structure of a mobile device and how it communicates with other devices, reference is made to FIGS. 1 through 3.

Referring first to FIG. 1, a block diagram of a mobile device in one example implementation is shown generally as 100. Mobile device 100 comprises a number of components, the controlling component being microprocessor 102. Microprocessor 102 is typically programmed with an operating system 103 and controls the overall operation of mobile device 100. In some embodiments, certain communication functions, including data and voice communications, are performed through a communications module also referred to herein as a communication subsystem 104. Communication subsystem 104 receives communications signals 90 (also referred to herein as "messages") from and sends messages to a wireless network 200. By way of example only, such communication signals 90 may correspond to phone calls, email or other data messages. Such communications signals 90 typically include identification information (such as caller ID information or identifier data 92) identifying the source of the message, as will be understood. In some instances, for example a conference call involving multiple third parties, the communications signals may include a plurality of caller IDs 92.

In this example implementation of mobile device 100, communication subsystem 104 is configured for cellular communication in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS).

New standards are still being defined, but it is believed that they will have similarities to the network behavior described herein, and it will also be understood by persons skilled in the art that the described embodiments are intended to use any other suitable standards that are developed in the future. The wireless link connecting communication subsystem 104 with network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network associated with mobile device 100 is a GSM/GPRS wireless network in one example implementation of mobile device 100, other wireless networks may also be associated with mobile device 100 in variant implementations. Different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and third-generation (3G) networks like EDGE and UMTS. Some older examples of data-centric networks include the Mobitex™ Radio Network and the DataTAC™ Radio Network. Examples of older voice-centric data networks include Personal Communication Systems (PCS) networks like GSM and Time Division Multiple Access (TDMA) systems.

Microprocessor 102 also interacts with additional subsystems such as memory 105 which may include a Random Access Memory (RAM) 106 and flash memory 108, display 110, auxiliary input/output (I/O) subsystem 112, serial port 114, keyboard 116, speaker 118, microphone 120, short-range communications 122 and other devices 124.

Some of the subsystems of mobile device 100 perform communication-related functions, whereas other subsystems may provide "resident" or on-device functions. By way of example, display 110 and keyboard 116 may be used for both communication-related functions, such as entering a text message for transmission over network 200, and device-resident functions such as a calculator, media player or task list. Operating system software 103 code used by microprocessor 102 is typically stored in a persistent store such as flash memory 108, which may alternatively be a read-only memory (ROM) or similar storage element (not shown). Those skilled in the art will appreciate that the operating system code 103, specific device applications, or parts thereof, may be temporarily loaded into a volatile store such as RAM 106.

In some embodiments, mobile device 100 may send and receive communication signals 90 over network 200 after required network registration or activation procedures have been completed. Network access is associated with a subscriber or user of a mobile device 100. To identify a subscriber, mobile device 100 requires a Subscriber Identity Module or "SIM" card 126 to be inserted in a SIM interface 128 in order to communicate with a network. SIM 126 is one type of a conventional "smart card" used to identify a subscriber of mobile device 100 and to personalize the mobile device 100, among other things. Without SIM 126, mobile device 100 is not fully operational for communication with network 200.

By inserting SIM 126 into SIM interface 128, a subscriber can access all subscribed services. Services could include: web browsing media transfers, such as music and/or image downloading or streaming, and messaging, such as e-mail, voice mail, Short Message Service (SMS), and Multimedia Messaging Services (MMS). More advanced services may include: point of sale, field service and sales force automation. SIM 126 includes a processor and memory for storing information. Once SIM 126 is inserted in SIM interface 128, it is coupled to microprocessor 102. In order to identify the subscriber, SIM 126 contains some user parameters such as an International Mobile Subscriber Identity (IMSI). An advantage of using SIM 126 is that a subscriber is not necessarily bound by any single physical mobile device. SIM 126 may store additional subscriber information for a mobile device as well, including datebook (or calendar) information and recent call information. In certain embodiments, SIM 126 may comprise a different type of user identifier and may be integral to mobile device 100 or not present at all.

Mobile device 100 is a battery-powered device and includes a battery interface 132 for receiving one or more rechargeable batteries 130. Battery interface 132 is coupled to a regulator (not shown), which assists battery 130 in providing power V+ to mobile device 100. Although current technology makes use of a battery, future technologies such as micro fuel cells may provide the power to mobile device 100.

Microprocessor 102, in addition to its operating system functions, enables execution of software applications on mobile device 100. A set of applications that control basic device operations, including data and voice communication applications, will normally be installed on mobile device 100 during its manufacture.

Additional applications may also be loaded onto mobile device 100 through network 200, auxiliary I/O subsystem 112, serial port 114, short-range communications subsystem 122, or any other suitable subsystem 124. This flexibility in application installation increases the functionality of mobile device 100 and may provide enhanced on-device functions, communication-related functions, or both. For example, secure communication applications may enable electronic commerce functions and other such financial transactions to be performed using mobile device 100.

Serial port 114 enables a subscriber to set preferences through an external device or software application and extends the capabilities of mobile device 100 by providing for information or software downloads to mobile device 100 other than through a wireless communication network. The alternate download path may, for example, be used to load an encryption key onto mobile device 100 through a direct and thus reliable and trusted connection to provide secure device communication.

Short-range communications subsystem 122 provides for communication between mobile device 100 and different systems or devices, without the use of network 200. For example, subsystem 122 may include an infrared device and associated circuits and components for short-range communication. Examples of short range communication would include standards developed by the Infrared Data Association (IrDA), Bluetooth, and the 802.11 family of standards developed by IEEE.

In use, a received signal such as a voice call, text message, an e-mail message, or web page download will be processed by communication subsystem 104 and input to microprocessor 102. Microprocessor 102 will then process the received signal for output to display 110 or alternatively to auxiliary I/O subsystem 112. A subscriber may also compose data items, such as e-mail messages, for example, using keyboard 116 in conjunction with display 110 and possibly auxiliary I/O subsystem 112.

Auxiliary I/O subsystem 112 may include devices such as: a touch screen, mouse, track ball, infrared fingerprint detector, and one or more roller wheels with dynamic button pressing capability. Keyboard 116 comprises an alphanumeric keyboard and/or telephone-type keypad. A composed item may be transmitted over network 200 through communication subsystem 104. User input components comprised in auxiliary I/O subsystem 112 may be used by the user to navigate and interact with a user interface of mobile device 100.

For voice communications, the overall operation of mobile device 100 is substantially similar, except that the received signals would be output to speaker 118, and signals for transmission would be generated by microphone 120. Alternative voice or audio I/O subsystems, such as a voice message recording subsystem, may also be implemented on mobile device 100. Although voice or audio signal output is accomplished primarily through speaker 118, display 110 may also be used to provide additional information such as the identity of a calling party, duration of a voice call, or other voice call related information.

Referring now to FIG. 2, a block diagram of the communication subsystem component 104 of FIG. 1 is shown. Communication subsystem 104 comprises a receiver 150, a transmitter 152, one or more embedded or internal antenna elements 154, 156, Local Oscillators (LOs) 158, and a processing module such as a Digital Signal Processor (DSP) 160.

The particular design of communication subsystem 104 is dependent upon the network 200 in which mobile device 100 is intended to operate, thus it should be understood that the design illustrated in FIG. 2 serves only as one example. Signals 90 received by antenna 154 through network 200 are input to receiver 150, which may perform such common receiver functions as signal amplification, frequency down conversion, filtering, channel selection, and analog-to-digital (A/D) conversion. A/D conversion of a received signal 90 allows more complex communication functions such as demodulation and decoding to be performed in DSP 160. In a similar manner, signals to be transmitted are processed, including modulation and encoding, by DSP 160. These DSP-processed signals are input to transmitter 152 for digital-to-analog (D/A) conversion, frequency up conversion, filtering, amplification and transmission over network 200 via antenna 156. DSP 160 not only processes communication signals, but also provides for receiver and transmitter control. For example, the gains applied to communication signals in receiver 150 and transmitter 152 may be adaptively controlled through automatic gain control algorithms implemented in DSP 160.

The wireless link between mobile device 100 and a network 200 may contain one or more different channels, typically different RF channels, and associated protocols used between mobile device 100 and network 200. A RF channel is a limited resource that must be conserved, typically due to limits in overall bandwidth and limited battery power of mobile device 100.

When mobile device 100 is fully operational, transmitter 152 is typically keyed or turned on only when it is sending to network 200 and is otherwise turned off to conserve resources. Similarly, receiver 150 is periodically turned off to conserve power until it is needed to receive signals or information (if at all) during designated time periods.

Referring now to FIG. 3, a block diagram of a node of a wireless network is shown as 202. In practice, network 200 comprises one or more nodes 202. Mobile device 100 communicates with a node 202 within wireless network 200. In the example implementation of FIG. 3, node 202 is configured in accordance with General Packet Radio Service (GPRS) and Global Systems for Mobile (GSM) technologies. Node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through network 200.

In a GSM network, MSC 210 is coupled to BSC 204 and to a landline network, such as a Public Switched Telephone Network (PSTN) 222 to satisfy circuit switched requirements. The connection through PCU 208, SGSN 216 and GGSN 218 to the public or private network (Internet) 224 (also referred to herein generally as a shared network infrastructure) represents the data path for GPRS capable mobile devices. In a GSM network extended with GPRS capabilities, BSC 204 also contains a Packet Control Unit (PCU) 208 that connects to SGSN 216 to control segmentation, radio channel allocation and to satisfy packet switched requirements. To track mobile device location and availability for both circuit switched and packet switched management, HLR 212 is shared between MSC 210 and SGSN 216. Access to VLR 214 is controlled by MSC 210.

Station 206 is a fixed transceiver station. Station 206 and BSC 204 together form the fixed transceiver equipment. The fixed transceiver equipment provides wireless network coverage for a particular coverage area commonly referred to as a "cell". The fixed transceiver equipment transmits communication signals to and receives communication signals from mobile devices within its cell via station 206. The fixed transceiver equipment normally performs such functions as modulation and possibly encoding and/or encryption of signals to be transmitted to the mobile device in accordance with particular, usually predetermined, communication protocols and parameters, under control of its controller. The fixed transceiver equipment similarly demodulates and possibly decodes and decrypts, if necessary, any communication signals received from mobile device 100 within its cell. Communication protocols and parameters may vary between different nodes. For example, one node may employ a different modulation scheme and operate at different frequencies than other nodes.

For all mobile devices 100 registered with a specific network, permanent configuration data such as a user profile is stored in HLR 212. HLR 212 also contains location information for each registered mobile device and can be queried to determine the current location of a mobile device. MSC 210 is responsible for a group of location areas and stores the data of the mobile devices currently in its area of responsibility in VLR 214. Further VLR 214 also contains information on mobile devices that are visiting other networks. The information in VLR 214 includes part of the permanent mobile device data transmitted from HLR 212 to VLR 214 for faster access. By moving additional information from a remote HLR 212 node to VLR 214, the amount of traffic between these nodes can be reduced so that voice and data services can be provided with faster response times and at the same time requiring less use of computing resources.

SGSN 216 and GGSN 218 are elements added for GPRS support; namely packet switched data support, within GSM. SGSN 216 and MSC 210 have similar responsibilities within wireless network 200 by keeping track of the location of each mobile device 100. SGSN 216 also performs security functions and access control for data traffic on network 200. GGSN 218 provides internetworking connections with external packet switched networks and connects to one or more SGSN's 216 via an Internet Protocol (IP) backbone network operated within the network 200. During normal operations, a given mobile device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring a DHCP server 220 connected to the GGSN 218.

There are many mechanisms for dynamic IP assignment, including using a combination of a Remote Authentication Dial-In User Service (RADIUS) server and DHCP server. Once the GPRS Attach is complete, a logical connection is established from a mobile device 100, through PCU 208, and SGSN 216 to an Access Point Node (APN) within GGSN 218. The APN represents a logical end of an IP tunnel that can either access direct Internet compatible services or private network connections. The APN also represents a security mechanism for network 200, insofar as each mobile device 100 must be assigned to one or more APNs and mobile devices 100 cannot exchange data without first performing a GPRS Attach to an APN that it has been authorized to use. The APN may be considered to be similar to an Internet domain name such as "myconnection.wireless.com".

Once the GPRS Attach is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) Contexts and there are a limited number of these available in the network 200. To maximize use of the PDP Contexts, network 200 will run an idle timer for each PDP Context to determine if there is a lack of activity. When a mobile device 100 is not using its PDP Context, the PDP Context can be deallocated and the IP address returned to the IP address pool managed by DHCP server 220.

Embodiments of mobile device 100 may be equipped and configured for communication over a cellular connection via communication subsystem 104 and with a wireless local area network (WLAN) using a communication form commonly termed "Wi-Fi". Such Wi-Fi connections may employ a suitable WLAN-compatible communication technology, of which unlicensed mobile access (UMA) technology is one example. UMA technology provides access to GSM and GPRS mobile services over unlicensed spectrum technologies, including Bluetooth™ and 802.11 wireless connections. UMA enables cellular network subscribers to roam and hand over between cellular networks and public and private wireless networks using dual-mode mobile handsets. Mobile device 100 may also be configured for communication with local wireless devices, such as Bluetooth™ enabled devices and may be configured for communication in a global positioning system (GPS) context.

The configuration and operation of an example mobile device, such as mobile device 100, in the context of displaying conference call participant identifier information is described in further detail in relation to FIGS. 4 to 8.

Figure 4:
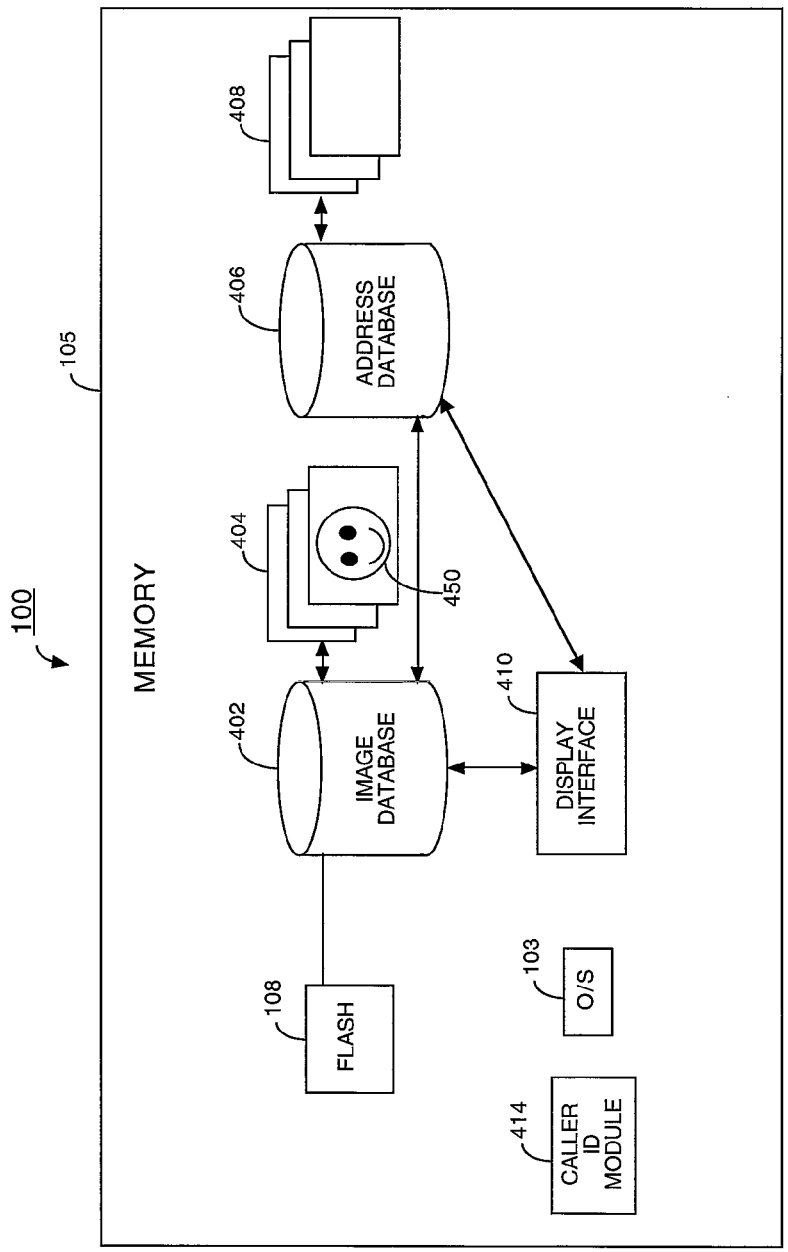
FIG. 4 is a schematic diagram showing in further detail various components of the mobile device of FIG. 1.

Referring now to FIG. 4, components of mobile device 100 are shown and described in further detail. The mobile device 100 may include an image database 402 which may be stored in memory 105 or other data storage. The image database 402 is configured to store a plurality of image data records 404 each containing data corresponding to an image 450. Alternatively, the image database 402 may be stored remotely, and the image data 404 may be communicated to the device 100.

The device 100 may include an address book database 406 which may be stored in memory 105 or other data storage. The address book database 406 is configured to store a plurality of address data records 408 each containing contact information data (such as a name, e.g. "Davey Jones") and one or more corresponding address data (for example a phone number, mailing address, or email address). The image database 402 may comprise part of the address book database 406, such that address data records 408 may store one or more corresponding images 450/image data records 404.

As will be discussed in greater detail, below, a display interface 410 is provided which includes computer program instructions stored within memory 105 (which may include flash memory 108, or other computer readable medium) for execution by the CPU 102. The display interface 410 is operatively coupled to the display 110 as well as to the communications module/communication subsystem 104.

Figure 5A:
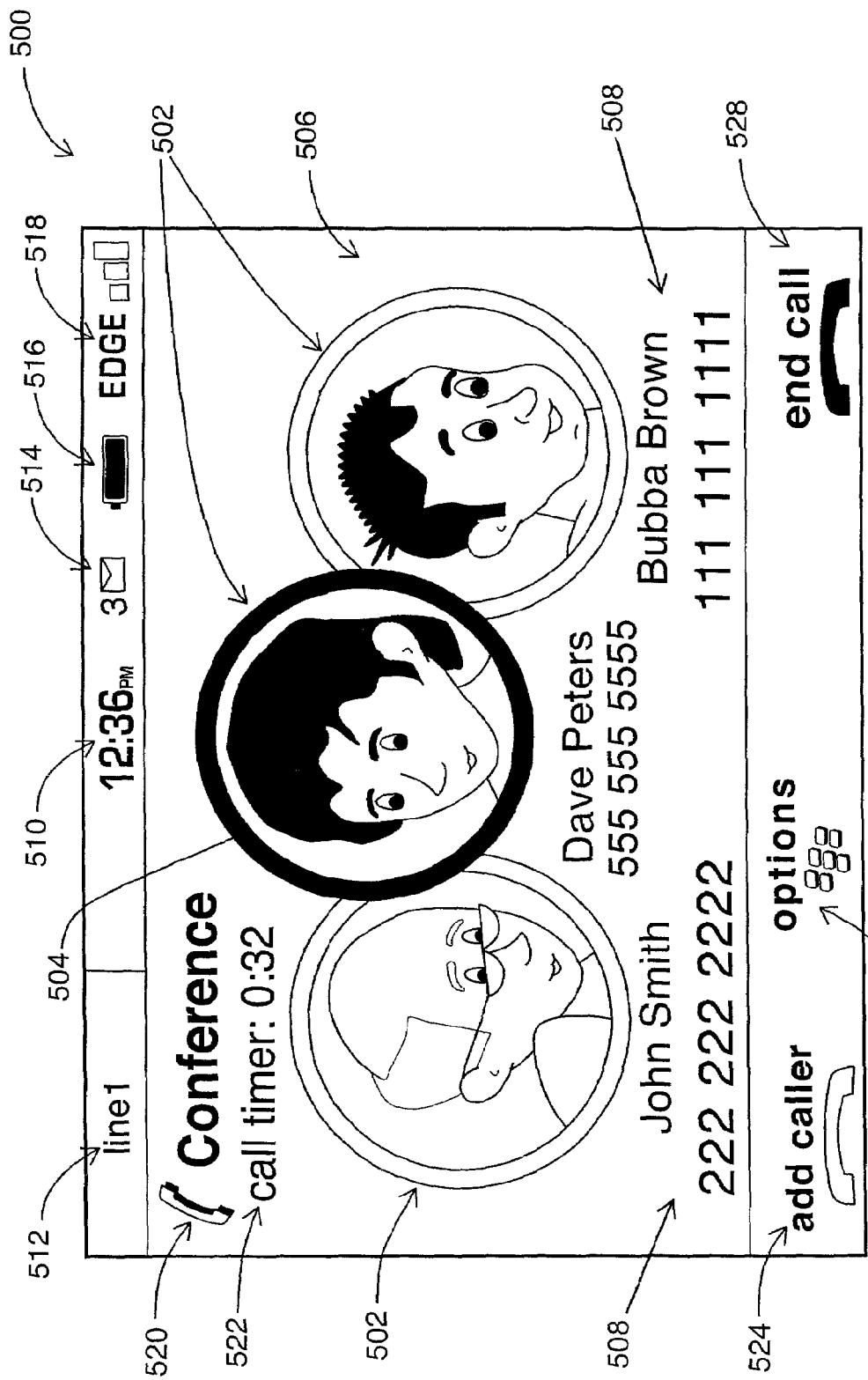
FIG. 5A is a graphical representation of a display of the mobile device of FIG. 1 showing a participant screen during a conference call.

Referring briefly to FIG. 5A, illustrated therein is one example screenshot of a participant screen 500 as may be generated by the display interface 410 and displayed on the display 110. Such a participant screen 500 may be used to manage a conference call. The participant screen 500 displays a plurality of participant identifier images 502 (in this example, three participant identifier images 502 are illustrated), each corresponding to a participant on a conference call. Typically, each participant identifier image 502 will comprise a photographic image of the corresponding participant.

The participant identifier images 502 are displayed in a "dynamic carousel" 506, which reference herein is intended to comprise a plurality of whole and/or partial images displayed on the participant screen 500, which can be scrolled or cycled through, as will be understood. For large numbers of participants, it may not be possible to display all or even part of all of the corresponding participant identifier images 502 simultaneously on the participant screen 500. In some embodiments, such display might resemble or bring to mind a carousel. The display interface 410 is configured to enable a user to cycle through and select participant identifier images 502 on the participant screen 500. A static selection field 504 or moveable ring may be provided on the participant screen 500, which may be used to designate or select a particular participant identifier image 502. Participant ID 508, such as a participant's name and/or phone number, corresponding to each displayed participant identifier image 502, is also displayed.

The display interface 410 includes or is operatively coupled to the keyboard 116 or one or more of the user input components in the auxiliary I/O subsystem 112, such as a thumbwheel, trackball, directional pad, joystick, or touchscreen which enable the user to select or otherwise generate user input received by the CPU 102 and designating which participant identifier image 502 (and hence corresponding participant) the user wishes to select or otherwise manipulate, as will be discussed in greater detail, below.

A clock indicator 510 noting the time of day is displayed, shown centrally justified (horizontally) near the top of display 110 in this example. A call line indicator 512, identifying which line is participating in the conference call (particularly for mobile devices 100 having multiple communication lines) is shown near the top left corner of the display 110. A mail message icon 514 and battery charge status indicator 516 are also provided. A data transmission indicator 518 in the upper-right hand corner of display 110 is also displayed.

A conference call indicator 520, indicating that the mobile device is engaged in a conference call, together with a conference call timer 522, are also provided. An add caller "button" 524, which may be used to add additional participants to the conference call as will be discussed further, below, an options "button" 526 for generating a pop-up menu listing application options, and an end call "button" 528 for terminating a conference call, are also illustrated. Other "buttons" and screen layouts are possible, as will be understood.

While "buttons" 524, 526, 528 are shown as virtual keys provided on the display 110 in this example, it will be understood by persons skilled in the art that some mobile devices may provide one or more of these keys as physical keys on the mobile device.

Referring again to FIG. 4, a caller identifier module 414 may also be provided which includes computer program instructions stored within memory 105 for execution by the CPU 102 for identifying incoming callers/participants. Memory 105 comprises various other program code, such as other software applications, although these are not specifically shown for purposes of simplicity of illustration. Data storage 105 accessible by the CPU 102 may also include high speed cache memory.

In implementations in which incoming calls may be permitted to join a conference call, the caller identifier module 414 may be configured to determine a participant identifier image 502 for display on the participant screen 500 by identifying an address book record 408 corresponding to a caller ID 92 received by the communications module 104 (if a match exists).

Figure 6:
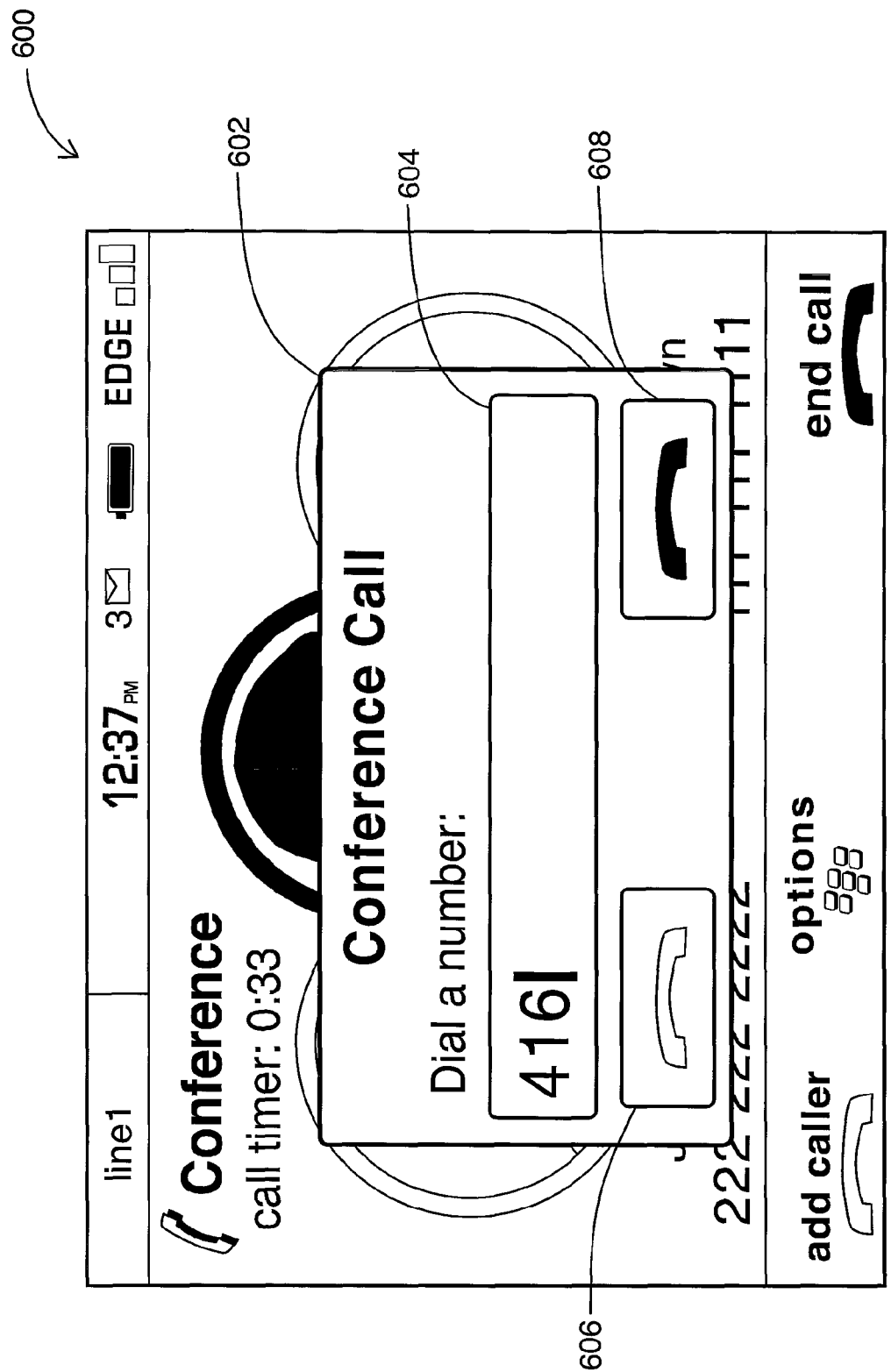
FIG. 6 is a graphical representation of a display of the mobile device of FIG. 1 showing an add caller window.

Referring to FIG. 6, illustrated therein is an example screenshot 600 having a pop-up window 602, as may be generated by the display interface 410 upon initiating a conference call or clicking or otherwise triggering the add caller "button" 524, after a call has been initiated. The add caller window 602 includes an entry field 604, which is configured to receive as input, identifier information such as a name (or in the example illustrated, a phone number). Once input, the identifier information may then be matched by the interface 410 to an address book record 408 (if a match exists) to determine a corresponding participant identifier image 502 for display on the participant screen 500. An initiate call "button" 606, for inputting the identifier information and initiating the call to the proposed new participant is also provided, as well as an end call "button" 608 for terminating a call attempt to a proposed new participant. The communications module 104 will utilize the identifier information to directly call the intended new participant directly, or if the conference call is being managed by a conference call server will communicate the necessary phone number information to the conference call server for connecting the intended new participant. In alternate embodiments, a participant might be added by selecting a record 408 directly from the address book 406 database stored on the device 100.

Figure 5B:
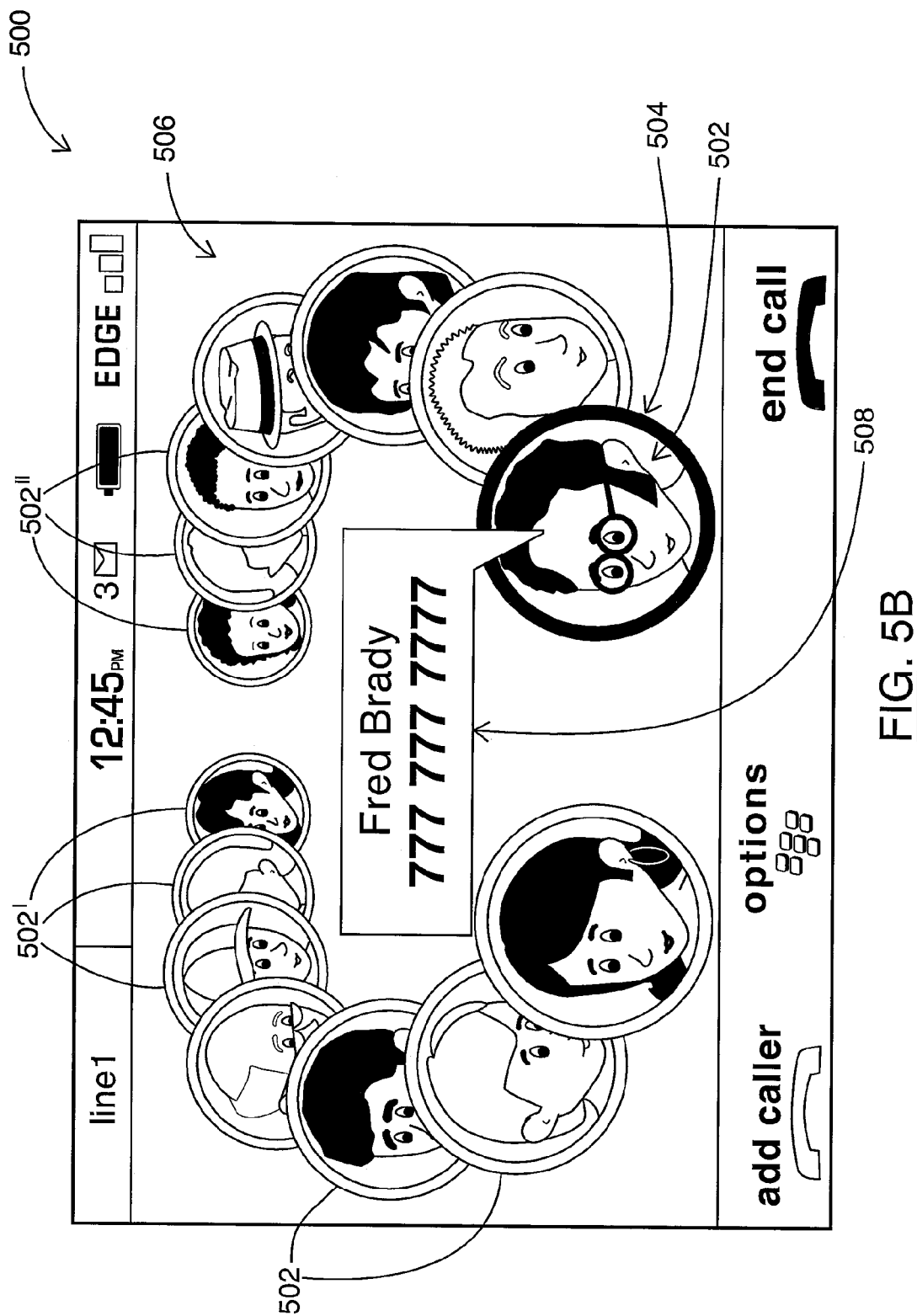
FIG. 5B is a graphical representation of a display of the mobile device of FIG. 1 showing the participant screen of FIG. 5A, after the inclusion of numerous additional participants to the conference call.

Referring now to FIG. 5B, illustrated therein is an example screenshot of the participant screen 500 as may be generated by the display interface 410 and displayed on the display 110, after numerous additional participants and their corresponding participant identifier images 502 have been added to the carousel 506. With this example, fourteen participant identifier images 502 (or parts thereof) are illustrated. The number of participant identifier images 502 displayed may be limited for reasons of sizing constraints, while other participants (not currently displayed) may also be participating in the conference call. In view of the larger number of participants 502 displayed, only the participant ID 508 corresponding to the participant identifier image 502 in the static selection field 504, is displayed on the participant screen 500.

Figure 5C:
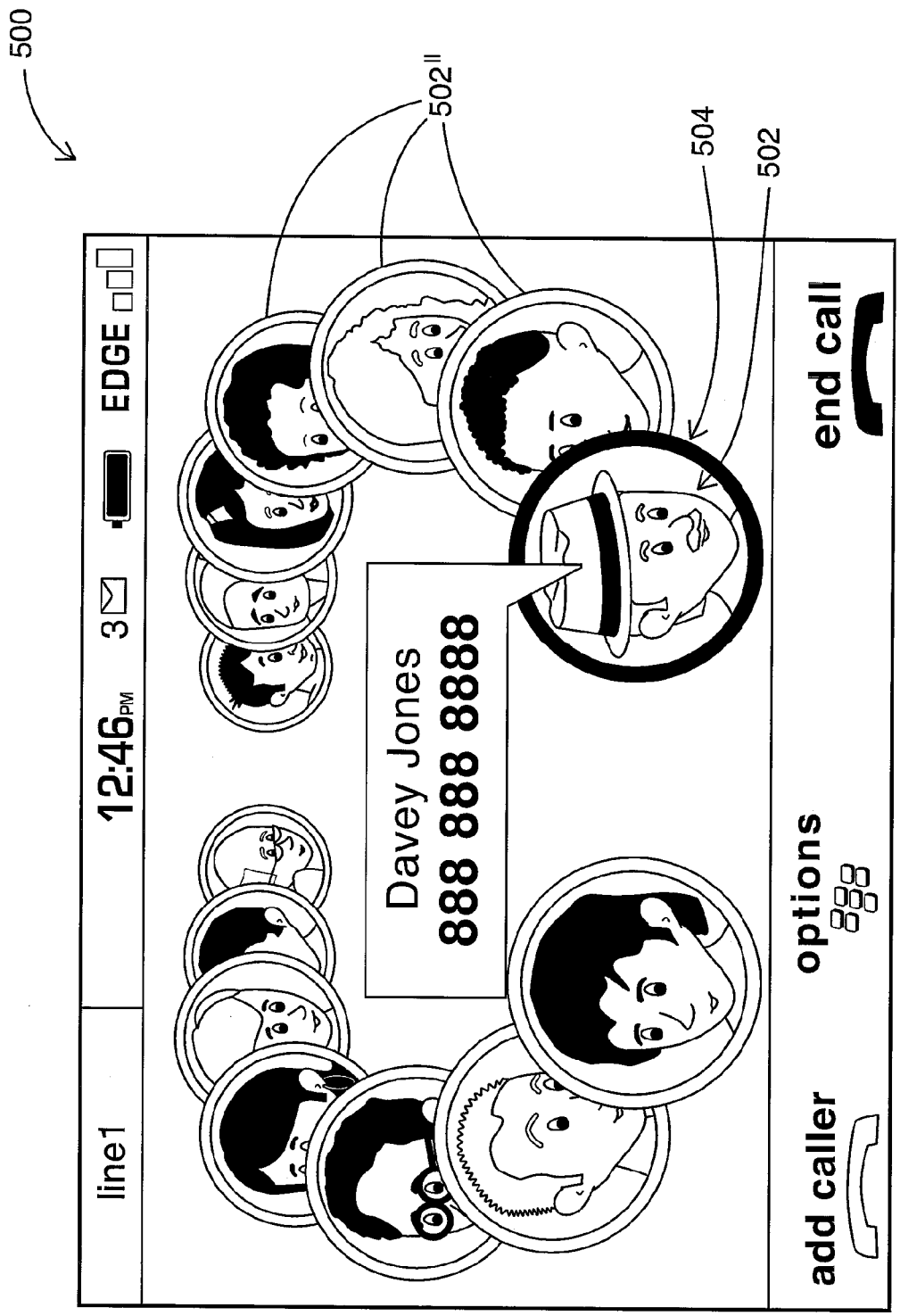
FIG. 5C is a graphical representation of a display of the mobile device of FIG. 1 showing the participant screen of FIG. 5B, after rotating the carousel of participants.

Referring now to FIG. 5C, illustrated therein is an example screenshot of the participant screen 500 of FIG. 5B, after the user has utilized the user input components 112 to cycle the participant identifier images 502 in the carousel 506 clockwise several positions. As can be seen, the participant identifier images 502' positioned in the top left hand position of the carousel 506 in FIG. 5B have disappeared, while new participant identifier images 502" (which were previously not illustrated because of space limitations) are now displayed in FIG. 5C. The participant ID 508 corresponding to the participant identifier image 502 now positioned in the static selection field 504, is displayed on the participant screen 500.

Figure 7:
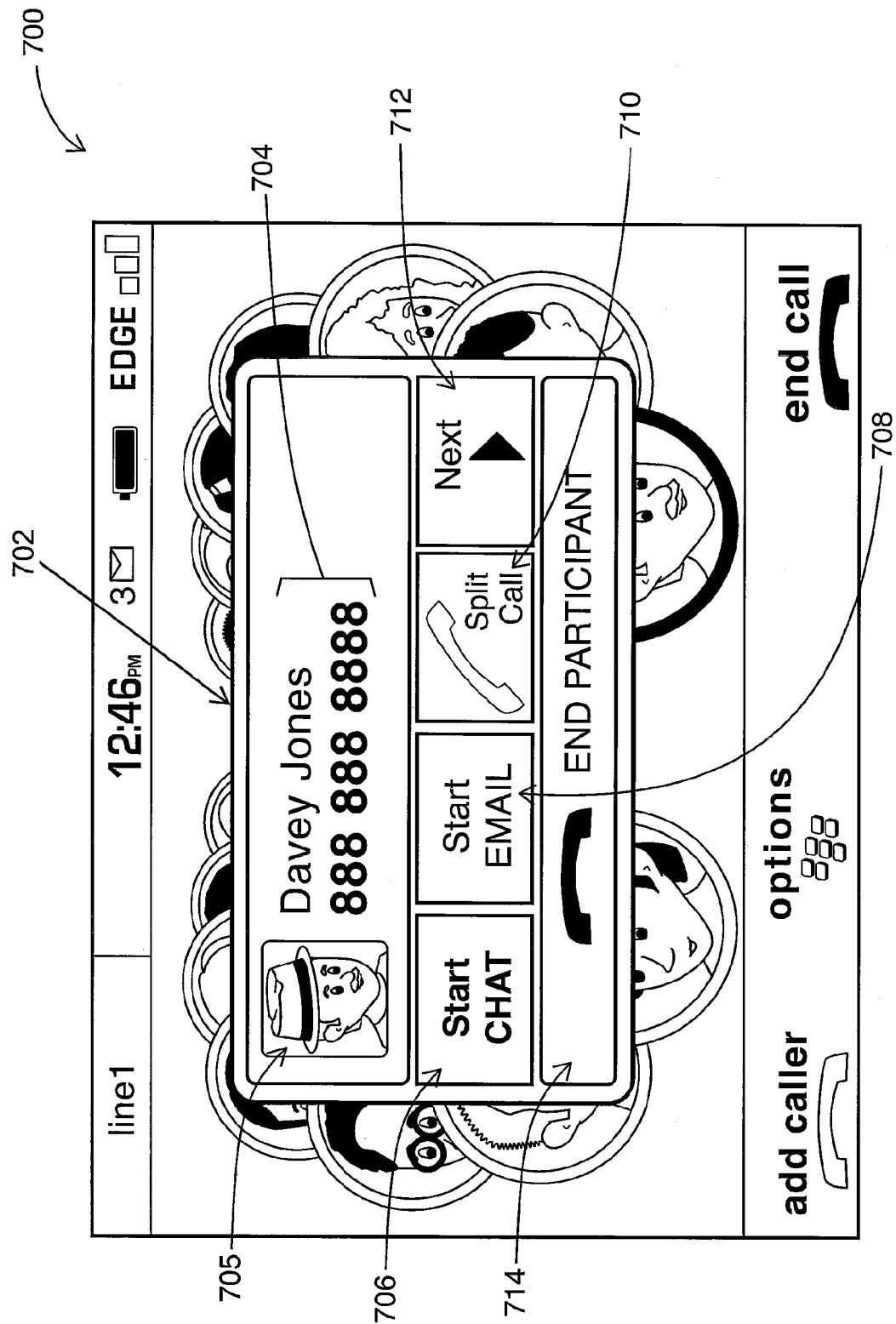
FIG. 7 is a graphical representation of a display of the mobile device of FIG. 1 showing a pop-up options menu.

The user may then "click" or otherwise utilize the user input components 112 to select or designate the participant identifier image 502/participant now positioned in the static selection field 504, which in the present embodiment results in the generation and display of the example screenshot 700 of FIG. 7. The screenshot 700 includes a pop-up options menu 702, which contains the selected participant identifier image 502/705, together with the corresponding selected participant ID 508/704. The options provided by the options menu 702 may permit the user to engage or modify the various communications modes provided by the communications module 104. Typically, although not exclusively, such menu options affecting communication modes will relate to the selected participant 508/704.

The menu 702 may include an IM ("instant message") Start Chat "button" 706, which may be used to initiate a IM chat with the designated participant 705 and send and receive instant messages. A start email "button" 708, to launch an email application and initiate the creation of an email message to be sent to the designated participant 705, and a split call "button" 710, to set up a sidebar, private voice call with the designated participant 705 or initiate a new conference call, may be provided. Other options may be reviewed by selection of a next "button" 712. For example, the additional options may include the establishment of a data link between the user's mobile device and that of the designated participant 705 to send and/or receive a multimedia signal. An end participant "button" 714, to terminate the participant's 705 participation in the conference call, may be provided.

Figure 8:
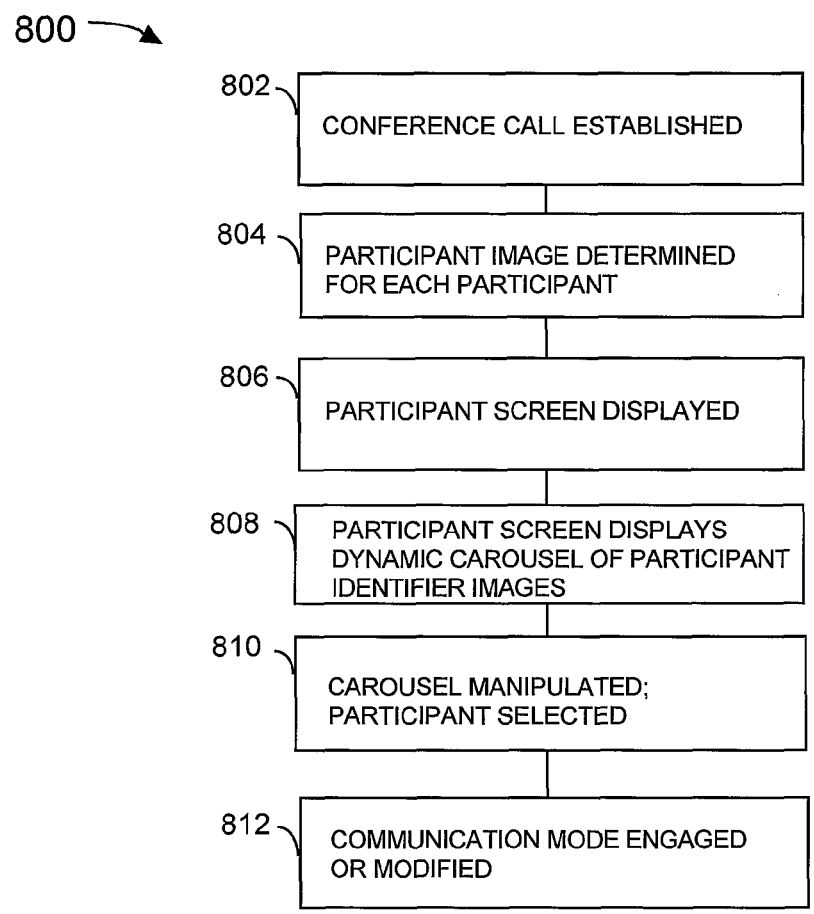
FIG. 8 is a flowchart of a method for presenting photo caller ID as may be used by the mobile device.

Referring now to FIG. 8, there is shown a method 800 of providing on mobile device 100 a user interface for identifying a plurality of participants on a conference call.

In operation, the method 800 may be initiated by the establishment of a conference call (Block 802). As noted previously, such a conference call may be coordinated through a conference call server, or through the mobile device 100 directly (if it has a sufficient number of communication lines available). The display interface 410 determines a participant identifier image 502 for each participant in the conference call (Block 804). As discussed in greater detail previously, the participant identifier images 502 may be determined as a result of the user calling or adding participants to the conference call (with the corresponding images 502 selected via the address book 406). As an alternative, the caller identifier module 414 may match caller ID 92 data to the address data (typically a phone number) stored in the address data records 408, to determine corresponding participant identifier image(s) 502. For participants not having a corresponding image 450 in the image database 402, a "dummy" placeholder image might be selected or generated.

A participant screen 500 may be displayed on the display 110 of the mobile device 100 (Block 806). The screen 500 displays the dynamic carousel 506 of participant identifier images 502 (Block 808). As discussed previously, the user may then utilize the display interface to modify or manipulate the carousel 506, typically to enable the selection of a designated participant identifier image (Block 810). Having selected a designated participant, as noted above, the user may then engage or modify a communication mode with such designated participant (Block 812).

While the above description provides example embodiments, it will be appreciated that some features and/or functions of the described embodiments are susceptible to modification without departing from the spirit and principles of operation of the described embodiments. Accordingly, what has been described above is intended to be illustrative of the claimed concept and non-limiting.

The invention claimed is:

1. A method for displaying a plurality of participant images corresponding to a plurality of participants in a teleconference in a teleconference communication mode on a mobile communications device, comprising:
   (a) for each participant in the teleconference, selecting a participant identifier image from a memory associated with the mobile communications device;
   (b) displaying on a participant screen a dynamic carousel comprising a plurality of participant identifier images which may be cycled through in response to user input;
   (c) rendering a static selection field on the participant screen for designating one of the participant identifier images; and
   (d) in response to designating one of the participant identifier images, engaging an additional communication mode with the participant corresponding to the designated participant identifier image.

2. The method of claim 1, wherein the mobile communications device further comprises an image database comprising at least one stored image, and wherein at least one participant identifier image is selected from the at least one stored image.

3. The method as claimed in claim 1, wherein the mobile communications device comprises a user input component, and wherein the user input component comprises at least one selected from the group consisting of: a keyboard, a thumbwheel, a trackball, a directional pad, a joystick and a touch screen.

4. The method of claim 1, wherein the mobile communications device further comprises an image database comprising a plurality of stored images, and wherein each participant identifier image is selected from the stored images.

5. A method for identifying a plurality of participants in a teleconference in a teleconference communication mode on a mobile communications device, comprising:
   (a) for each participant in the teleconference, selecting a participant identifier image from a memory associated with the mobile communications device;
   (b) displaying a dynamic carousel on a display of the mobile communications device a dynamic carousel comprising a plurality of participant identifier images which may be cycled through in response to user input;
   (c) rendering a static selection field on the participant screen configured for designating one of the participant identifier images; and
   (d) in response to designating one of the participant identifier images, engaging a second communication mode with a designated participant corresponding to the designated participant identifier image.

6. The method as claimed in claim 5, wherein the mobile communications device further comprises an image database comprising a plurality of stored images, and wherein at least one participant identifier image is selected from the stored images.

7. The method as claimed in claim 5, wherein the mobile communications device further comprises a display interface operatively coupled to the display, wherein the display interface is configured to respond to user input and selectively modify the carousel of participant identifier images on the participant screen.

8. The method as claimed in claim 7, wherein the mobile communications device further comprises a communications module configured for sending and receiving communication signals.

9. The method as claimed in claim 8, wherein the communications module is configured to engage a plurality of additional communication modes.

10. The method as claimed in claim 9, wherein the display interface is configured to engage at least one additional communication mode corresponding to the designated participant.

11. The method as claimed in claim 9, wherein the plurality of additional communication modes comprise at least one selected from the group consisting of sending and receiving:
 (a) a voice signal;
 (b) a multimedia signal;
 (c) an instant message; and
 (d) an email message.

12. The method as claimed in claim 7, wherein the display interface comprises a user input component, and wherein the user input component comprises at least one selected from the group consisting of: a keyboard, a thumbwheel, a trackball, a directional pad, a joystick and a touch screen.

13. A mobile communications device comprising a processor, a display, and a communications module, wherein the processor is configured to execute an application programmed to perform:
 (a) for each participant in a teleconference in a teleconference communication mode, selecting a participant identifier image;
 (b) displaying on the display of the mobile communications device a dynamic carousel comprising a plurality of participant identifier images which may be cycled through in response to user input;
 (c) rendering a static selection field on the participant screen configured for designating one of the participant identifier images; and
 (d) in response to designating one of the participant identifier images, engaging an additional communication mode with a designated participant corresponding to the designated participant identifier image.

14. The mobile communications device as claimed in claim 13, wherein the mobile communications device further comprises an image database comprising a plurality of stored images, and wherein at least one participant identifier image is selected from the stored images.

15. The mobile communications device as claimed in claim 13, wherein the mobile communications device further comprises a display interface operatively coupled to the display, wherein the display interface is configured to respond to user input and selectively modify the carousel of participant identifier images on the participant screen.

16. The mobile communications device as claimed in claim 15, wherein the communications module is configured to simultaneously engage a plurality of communication modes.

17. The mobile communications device as claimed in claim 16, wherein the display interface is configured to select a designated participant identifier image corresponding to a designated participant.

18. The mobile communications device as claimed in claim 17, wherein the display interface is configured to modify at least one communication mode corresponding to the designated participant.

19. The mobile communications device as claimed in claim 18, wherein the plurality of communication modes comprise at least one selected from the group consisting of sending and receiving:
 (a) a voice signal;
 (b) a multimedia signal;
 (c) an instant message; and
 (d) an email message.

20. The mobile communications device as claimed in claim 15, wherein the display interface comprises a user input component, and wherein the user input component comprises at least one selected from the group consisting of: a keyboard, a thumbwheel, a trackball, a directional pad, a joystick and a touch screen.

21. The mobile communications device as claimed in claim 15, wherein the communications module is configured to simultaneously engage a plurality of communication modes between at least two participants in the teleconference.

* * * * *